United States Patent
Yogo et al.

(10) Patent No.: US 10,507,810 B2
(45) Date of Patent: Dec. 17, 2019

(54) ELECTRIC BRAKE DEVICE

(71) Applicant: TOYOTA JIDOSHA KABUSHIKI KAISHA, Toyota-shi, Aichi-ken (JP)

(72) Inventors: Seiji Yogo, Nagoya (JP); Masayasu Ohkubo, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 28 days.

(21) Appl. No.: 15/722,173

(22) Filed: Oct. 2, 2017

(65) Prior Publication Data

US 2018/0099651 A1 Apr. 12, 2018

(30) Foreign Application Priority Data

Oct. 7, 2016 (JP) .................. 2016-198949

(51) Int. Cl.
| | |
|---|---|
| *B60T 8/32* | (2006.01) |
| *B60T 8/171* | (2006.01) |
| *B60T 13/74* | (2006.01) |
| *F16D 55/22* | (2006.01) |
| *F16D 121/24* | (2012.01) |

(52) U.S. Cl.
CPC ............ *B60T 8/32* (2013.01); *B60T 8/171* (2013.01); *B60T 13/741* (2013.01); *F16D 55/22* (2013.01); *F16D 2121/24* (2013.01)

(58) Field of Classification Search
CPC . B60T 8/32; B60T 7/107; B60T 8/171; B60T 13/741; F16D 55/22; F16D 55/226; F16D 65/183; F16D 2201/12; F16D 2066/003; F16D 2121/24; F16D 2125/40
See application file for complete search history.

(56) References Cited

U.S. PATENT DOCUMENTS

| | | | |
|---|---|---|---|
| 6,481,805 | B1 | 11/2002 | Ichinose et al. |
| 2001/0023798 | A1* | 9/2001 | Usui ...................... F16D 65/18 |
| | | | 188/72.1 |
| 2003/0125863 | A1 | 7/2003 | Tamasho et al. |
| 2005/0206236 | A1 | 9/2005 | Mori et al. |
| 2013/0218433 | A1 | 8/2013 | Matsuno |
| 2014/0000993 | A1 | 1/2014 | No |
| 2014/0069750 | A1 | 3/2014 | Nohira et al. |

(Continued)

FOREIGN PATENT DOCUMENTS

| | | |
|---|---|---|
| EP | 1 127 763 A2 | 8/2001 |
| EP | 1127761 A2 | 8/2001 |
| EP | 2799297 A1 | 11/2014 |

(Continued)

*Primary Examiner* — Melanie Torres Williams
(74) *Attorney, Agent, or Firm* — Sughrue Mion, PLLC (57) ABSTRACT

An electric brake device includes: an electric brake being configured such that a shaft is moved forward by diving of an electric motor, and the forward movement of the shaft brings the electric brake into an acting state in which brake friction members are pushed against a brake rotary body so as to suppress rotation of a wheel; and a motor controller being configured to control the electric motor, wherein through a rotation speed control on the electric motor, after the shaft reaches a set position before the electric brake comes into the acting state, the motor controller controls a forward speed of the shaft to be smaller than that before the shaft reaches the set position.

10 Claims, 7 Drawing Sheets

(56) References Cited

U.S. PATENT DOCUMENTS

2016/0001752 A1   1/2016   Yasui et al.

FOREIGN PATENT DOCUMENTS

| EP | 3042814 A1 * | 7/2016 | ............ B60T 13/741 |
|----|---|---|---|
| JP | 2001239929 A | 9/2001 | |
| JP | 2003-194119 A | 7/2003 | |
| JP | 2004124950 A | 4/2004 | |
| JP | 2012-240632 A | 12/2012 | |
| KR | 1020090119486 A | 11/2009 | |
| KR | 10-2014-0003839 A | 1/2014 | |

* cited by examiner

RELATED ART

ELECTRIC BRAKE DEVICE

INCORPORATION BY REFERENCE

The disclosure of Japanese Patent Application No. 2016-198949 filed on Oct. 7, 2016 including the specification, drawings and abstract is incorporated herein by reference in its entirety.

BACKGROUND

1. Technical Field

This disclosure relates to an electric brake device including an electric brake provided to a wheel.

2. Description of Related Art

In an electric brake device described in Japanese Patent Application Publication No. 2003-194119, after a set time period passes since an electric brake is released and when the electric brake is out of an acting state, a shaft is moved forward from a rearmost position thereof, and a stroke of the shaft until an inner friction member and an outer friction member come into contact with a disc rotor is acquired, and this stroke is stored as a braking start position. In this manner, since the braking start position is acquired in a state in which the friction members are cooled, it is possible to make delay of a braking-force generation timing smaller. In addition, after the braking start position is acquired, the shaft can be moved rearward by a predetermined amount; therefore, it is possible to preferably suppress brake drag.

SUMMARY

This disclosure provides an electric brake suppressing vibrations to be generated.

A first aspect of this disclosure relates to an electric brake device. The electric brake device includes an electric brake being configured such that a shaft is moved forward by diving of an electric motor, and the forward movement of the shaft brings the electric brake into an acting state in which brake friction members are pushed against a brake rotary body so as to suppress rotation of a wheel; and a motor controller being configured to control the electric motor, wherein through a rotation speed control on the electric motor, after the shaft reaches a set position before the electric brake comes into the acting state, the motor controller controls a forward speed of the shaft to be smaller than that before the shaft reaches the set position.

In the above aspect, it may be configured that through the above control on the electric motor, the motor controller controls the forward speed of the shaft to become the first speed, before the shaft reaches the set position, and the motor controller controls the forward speed thereof to become the second speed smaller than the first speed, after the shaft reaches the set position. The shaft is linearly moved along with the rotation of the electric motor, and the rotation speed of the electric motor and the forward speed of the shaft uniquely correspond to each other. In the electric brake device described herein, the respective forward speeds of the shaft before and after the shaft reaches the set position are set to be constant. On the other hand, the respective forward speeds of the shaft before and after the shaft reaches the set position may also be set to be variable.

In the above aspect, before the shaft reaches the set position, the motor controller may control the rotation speed of the electric motor to be a maximum rotation speed that can be outputted by the electric motor.

In the above aspect, the motor controller may control the rotation speed of the electric motor such that the forward speed of the shaft becomes the second speed after the shaft reaches the set position until the electric motor comes into an acting state. The second speed may be set at a degree that can suppress initial response time of the brake, and also suppress vibrations generated when the electric brake comes into the acting state, or the like. For example, the second speed may be a speed of 50% or more, 60% or more, 70% or more, 90% or less, 80% or less, 70% or less, or 60% or less of the first speed. Further, the second speed may be a speed at which a time period from output of a brake-operation instruction until the electric brake comes into the acting state becomes the set time period or less, or the above time period may be 200% or less, 150% or less, or 130% or less than a time period in the case in which no speed reduction is carried out, or the like.

In the above aspect, the motor controller may control the electric motor such that when the electric brake comes into the acting state, an axial force applied to the shaft is brought to approximate a target axial force determined based on an operation condition of a brake operation member operated by a driver. The target axial force is determined based on the brake operation condition operated by a driver, and may also be a value determined in consideration of a regenerative braking force when a regenerative cooperation control is carried out. In the axial-force control unit, the feedback control may be carried out such that a measurement value of the axial force is brought to approximate the target axial force.

In the above aspect, the set position may be defined as a position determined based on a value of variation of a gap between the brake friction member and a front end surface of the shaft when the shaft is at a rearmost position. The set position may be defined as a position determined based on a lower limit value of variation of the gap, for example.

In the above aspect, the brake rotary body may be a disc rotor integrally and rotatably fixed to the wheel, the electric brake may be a disc brake that includes a pair of brake friction members located on both sides of the disc rotor, and comes into the acting state in which the pair of brake friction members are pushed against the disc rotor, the motor controller may store a contact position that is a position where the shaft comes into contact with the disc rotor via one of the pair of brake friction members, and the motor controller may define, as the set position, a position located more rearward with not less than a distance determined based on a standard value of camming of the disc rotor than the contact position stored during a previous operation of the electric brake. In the disc brake, due to the forward movement of the shaft, the shaft comes into contact with one of the pair of brake friction members, and no gap is present between the brake friction member and the disc rotor, so that the brake friction member comes into contact with the disc rotor. This state is a state in which the shaft comes into contact with the disc rotor via the brake friction member. A further forward movement of the shaft moves the caliper, so that the other brake friction member is pushed against the disc rotor; thus the pair of brake friction members are pushed against the disc rotor by the shaft and the caliper. This state is the acting state of the electric brake. In the electric brake device described herein, the set position is defined as a position before the shaft comes into contact with the disc rotor via one of the pair of brake friction members. As a result, the forward speed of the shaft is reduced before the shaft comes into contact with the disc rotor via one of the brake friction members; therefore, when the shaft comes into contact with the disc rotor via one of the brake friction members, it is also possible to suppress the vibrations generated when the electric brake comes into the acting state.

In the above aspect, the electric brake device may include: a speed reducer that reduces rotation of the electric motor; and a movement converting mechanism that converts the rotation of an output shaft of the speed reducer into a linear movement, and outputs the linear movement to the shaft.

In the above aspect, the electric brake device may include: a stroke sensor detecting a stroke of the shaft; and an axial sensor detecting an axial force applied to the shaft.

A second aspect of this disclosure is direct to an electric brake device. The electric brake device includes: an electric brake being configured to be operated by driving of an electric motor, and push brake friction members against a brake rotary body by using a shaft so as to suppress rotation of a wheel; and a motor controller being configured to control the electric motor, wherein through a rotation speed control on the electric motor, the motor controller controls a forward speed of the shaft to be not more than a predefined set speed, after the shaft reaches a set position before the shaft comes into contact with the brake rotary body via the brake friction members. The set speed may be at a degree that can suppress vibrations, and reduce the initial response time. The set speed may be not less than the second speed and smaller than the first speed.

A third aspect of this disclosure is direct to electric brake device. The electric brake device includes: an electric brake being configured to be operated by driving of an electric motor, and push brake friction members against a brake rotary body by using a shaft so as to suppress rotation of a wheel; and a motor controller being configured to control the electric motor, wherein through a rotation speed control on the electric motor, the motor controller controls a forward speed of the shaft to be smaller than a forward speed thereof before the shaft reaches a set position, after the shaft reaches the set position before the shaft comes into contact with the brake rotary body via the brake friction members. In this electric brake device, the forward speed of the shaft is reduced before the shaft comes into contact with the brake rotary body via the brake friction members. As a result, it is possible to suppress vibrations generated when the shaft comes into contact with the brake rotary body via the brake friction members, or the like.

In the above aspect, the forward speed of the shaft of the electric brake is reduced before the electric brake comes into the acting state. As a result, it is possible to suppress vibrations generated at the time of applying the brake. In addition, if the forward speed of the shaft is reduced before the shaft comes into contact with the brake rotary body via the brake friction members, it is also possible to suppress vibrations generated when the shaft comes into contact with the brake rotary body via the brake friction members.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a brake system including electric brake devices according to one embodiment of this disclosure will be described with reference to drawings.

Figure 1:
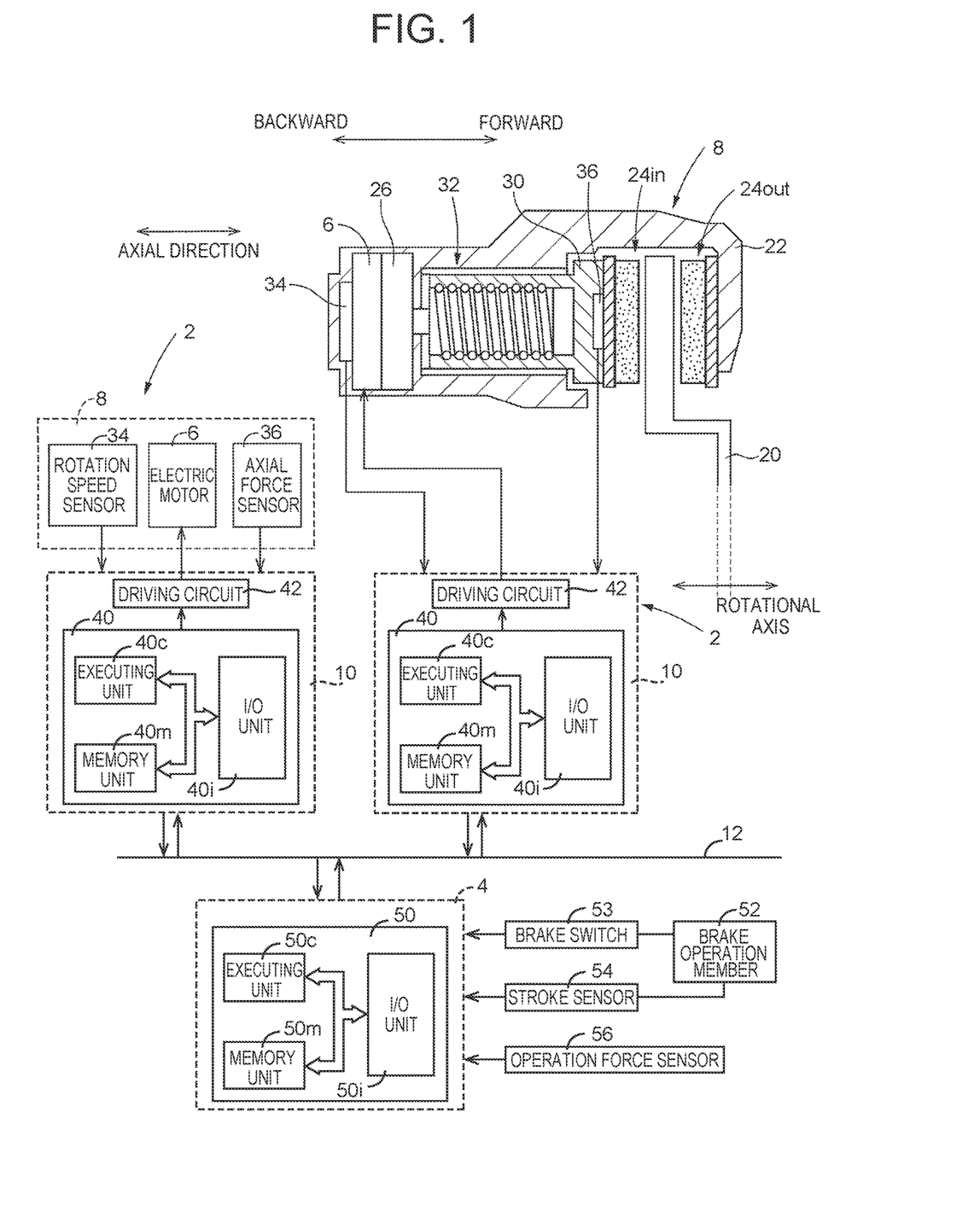
FIG. 1 is a conceptual view of a brake system including electric brake devices according to this disclosure.

As shown in FIG. 1, this brake system includes multiple electric brake devices 2 that are respectively provided to two or more of multiple wheels included in a vehicle, and a brake ECU 4. Each of the electric brake devices 2 is equipped with an electric motor 6, and includes an electric brake 8 suppressing rotation of the wheel by driving of the electric motor 6, and a motor ECU 10 controlling the electric motor 6. The motor ECU 10 and the brake ECU 4 are connected to each other via a CAN (controller area network) 12 so as to be communicable with each other.

As shown in FIG. 1, the electric brake 8 is a disc brake, and includes: (1) a caliper 22 that is disposed in a posture of extending across a disc rotor (hereinafter, referred to briefly as a rotor) 20 as a brake rotary body integrally rotatable with the wheel, and is fixed to a not-illustrated non-rotary body of a vehicle body in a direction parallel to a rotational axis (hereinafter, referred to as an axial direction) of the wheel; (2) a pair of brake friction members 24in, 24out that are held to the non-rotary body in a manner as to be movable in the axial direction, and are respectively located on an inner side and an outer side of the rotor 20; (3) the electric motor 6 and a speed reducer 26 that reduces rotation of the electric motor 6 and outputs this rotation, the electric motor 6 and the speed reducer 26 being held inside the caliper 22; (4) a shaft 30 held to the caliper 22 in a manner as to be rotatably fixed to the caliper 22 and movable in the axial direction; and (5) a movement converting mechanism 32 including a screw mechanism that converts rotation of an output shaft of the speed reducer 26 into a linear movement, and outputs this movement to the shaft 30, and others. Each of the brake friction members (hereinafter, referred to briefly as friction members) 24in, 24out includes a pad and a back plate.

The electric brake 8 includes a rotation speed sensor 34 detecting a rotation speed of the electric motor 6, an axial force sensor 36 detecting an axial force that is a force in the axial direction that acts on the shaft 30, and others. In this embodiment, the axial force sensor 36 is provided to a front end (a portion contactable with the friction member 24in) of the shaft 30, but it is not always essential to provide the axial force sensor 36 to the front end of the shaft 30. A movement speed of the shaft 30 is acquired based on the rotation speed of the electric motor 6 detected by the rotation speed sensor 34, and others, and a movement distance of the shaft 30 is obtained by integrating the movement speed of the shaft 30. In this embodiment, a movement distance from a predefined rearmost position of the shaft 30 is referred to as a stroke. A position or a stroke of the shaft 30 can be represented by a stroke or a position of a front end surface 30A of the shaft 30 with reference to the front end surface 30A as a predefined portion of the shaft 30. In addition, the position of the shaft 30 can be represented by a stroke of the front end surface 30A of the shaft 30, that is, a distance from the rearmost position of the front end surface 30A of the shaft 30.

The motor ECU 10 includes a controller 40 mainly composed of a computer, and the controller 40 includes an executing unit 40c, a memory unit 40m, and an I/O (input/output) unit 40i, and others. The rotation speed sensor 34 and the axial force sensor 36 are connected to the controller 40, and the electric motor 6 is also connected to the controller 40 via a driving circuit 42.

The brake ECU 4 includes a controller 50 mainly composed of a computer, and the controller 50 includes an executing unit 50c, a memory unit 50m, and an I/O (input/output) unit 50i, and others. A brake switch 53 detecting whether or not a brake operation member 52 such as a brake pedal is in operation, a stroke sensor 54 detecting an operation stroke of the brake operation member 52, an operation force sensor 56 detecting an operation force applied to the brake operation member 52 by a drive, or a physical amount uniquely corresponding to the operation force, and others are connected to the controller 50.

Figure 2A:
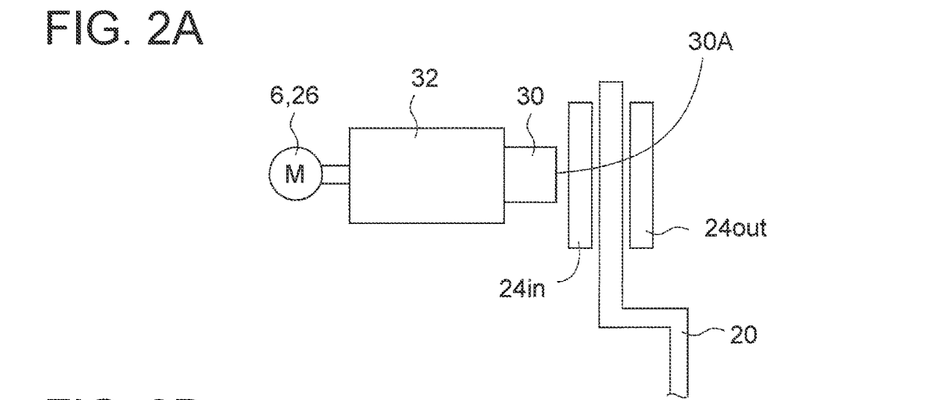
FIG. 2A is a view showing operation of an electric brake of the electric brake device, and a view showing the electric brake out of an acting state.
Figure 2B:
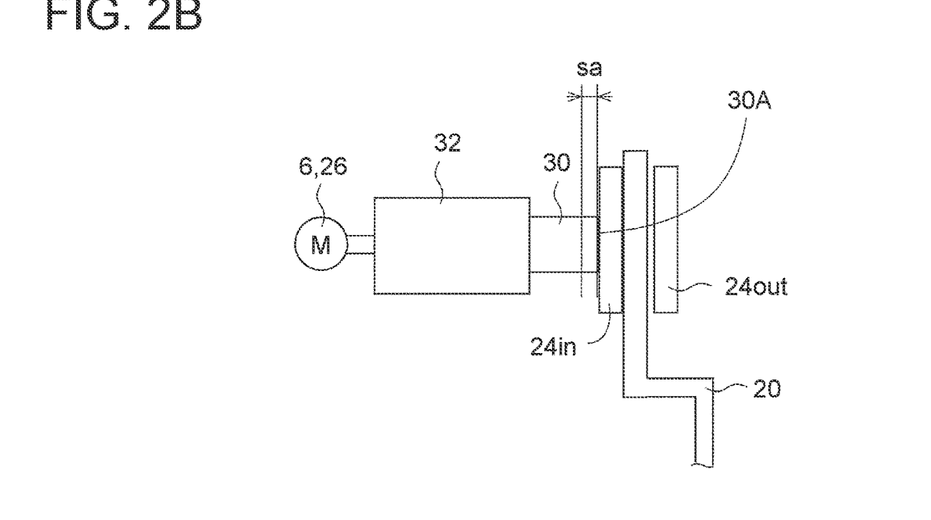
FIG. 2B is a view showing the operation of the electric brake device, and a view showing a state in which a shaft is in contact with a rotor via a friction member.

In the above-configured brake system, when the electric brake 8 is out of the acting state, as shown in FIG. 2A, there are usually gaps between the pair of brake friction members 24in, 24out and the rotor 20. The shaft 30 is located at the rearmost position, and the front end surface 30A of the shaft 30 is located rearward of the friction member 24in with a distance therebetween. In this manner, in the electric brake 8, by the operation of the electric motor 6, the front end surface 30A of the shaft 30 can be moved more rearward than the friction member 24in; therefore, it is possible to preferably suppress brake drag when the electric brake 8 is out of the acting state. When a brake-operation instruction is outputted, as shown in FIG. 2B, the electric motor 6 is started up so as to move the shaft 30 forward. When the stroke of the shaft 30 reaches a contact stroke sa, the shaft 30 then comes into contact with the friction member 24in, and the friction member 24in comes into contact with the rotor 20. The shaft 30 comes into a state in contact with the rotor 20 via the friction member 24in.

Figure 2C:
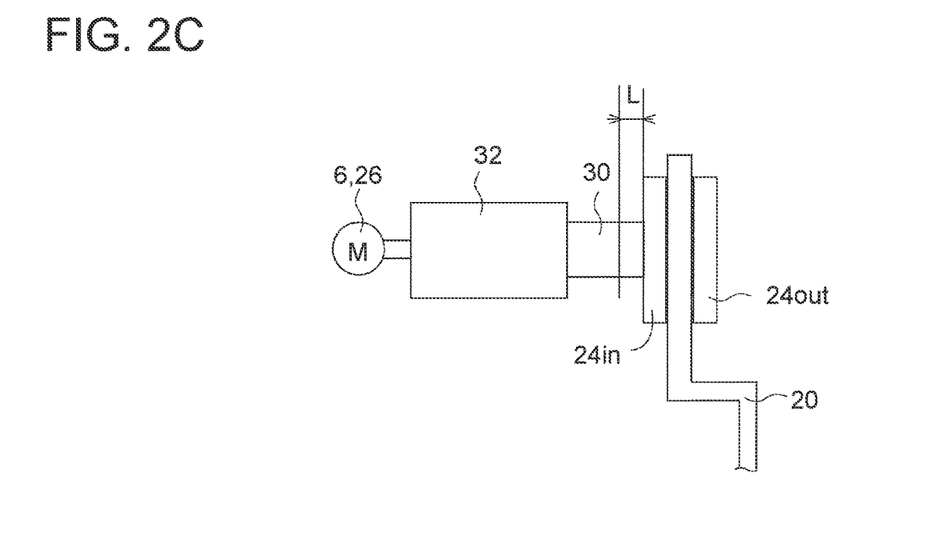
FIG. 2C is a view showing the operation of the electric brake of the electric brake device, and a view showing a state in which a pair of friction members are pushed against the rotor.

Thereafter, as shown in FIG. 2C, a further forward movement of the shaft 30 moves the caliper 22 in the axial direction, and thus the friction member 24out is pushed against the rotor 20 by the caliper 22. The pair of brake friction members 24in, 24out are pushed against the rotor 20 by the shaft 30 and the caliper 22, and thus the electric brake 8 comes into an acting state. A stroke L is a stroke of the shaft 30 until the pair of brake friction members 24in, 24out are pushed against the rotor 20 by the shaft 30 and the caliper 22 (hereinafter, referred to briefly as "the pair of brake friction members 24in, 24out are pushed against the rotor 20").

Figure 7:
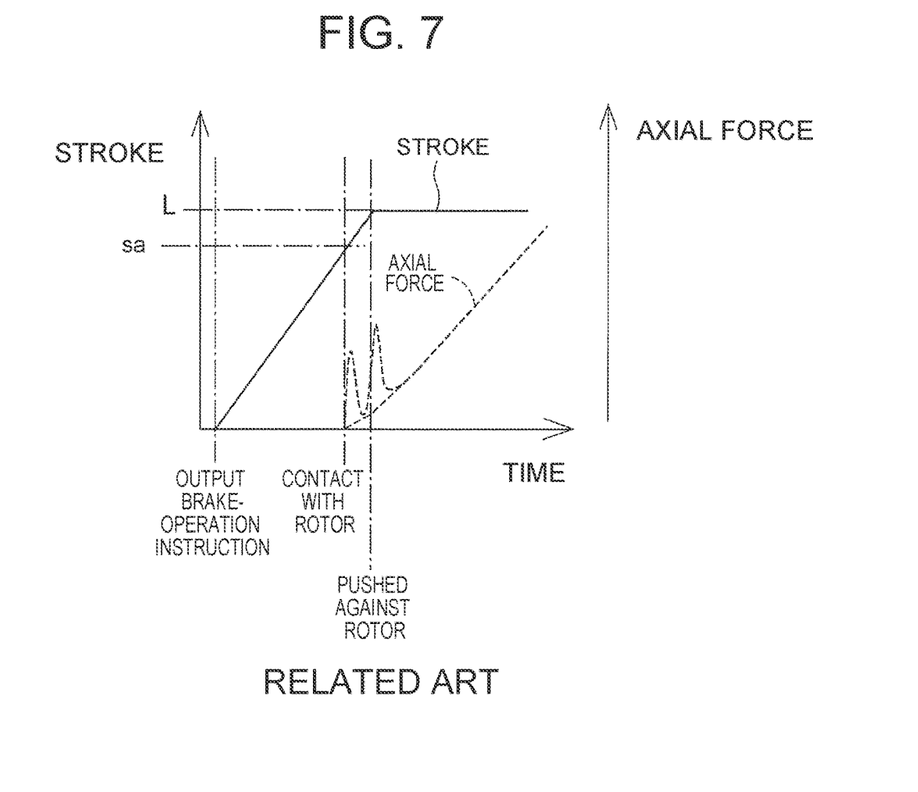
FIG. 7 is a view showing changes of a stroke and an axial force of an electric brake of an electric brake device to which this disclosure is not applied.

However, at the time of start-up of the electric motor 6, normally, the electric motor 6 is rotated at a greater rotation speed so as to move the shaft 30 forward at a greater speed. Hence, as shown in FIG. 7, when the shaft 30 comes into contact with the rotor 20 via the friction member 24in (briefly described as "contact with rotor" in the drawing), an axial force applied to the shaft 30 becomes drastically increased at the moment when the pair of brake friction members 24in, 24out are pushed against the rotor 20 (briefly described as "pushed against rotor" in the drawing), thus causing great vibrations. Due to this, great sounds are generated, or noises are likely to be caused to the motor ECU 10. In particular, when the motor ECU 10 is disposed in the vicinity of the electric motor 6, or is integrally provided to the electric motor 6, noises are more likely to be caused.

Figure 3:
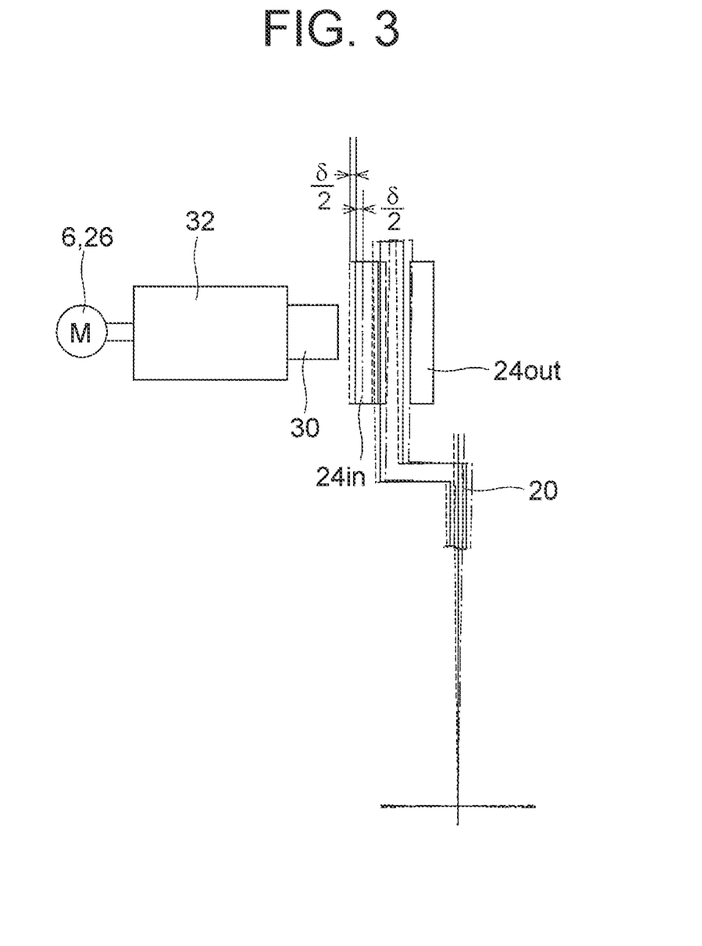
FIG. 3 is a view showing camming of the rotor of the electric brake.

To cope with this, in this embodiment, it is configured that the forward speed of the shaft 30 is reduced before the shaft 30 comes into contact with the rotor 20 via the friction member 24in. Meanwhile, as shown in FIG. 3, if the rotor 20 experiences camming, the stroke of the shaft 30 until the shaft 30 comes into contact with the rotor 20 via the friction member 24in varies due to this camming. The camming of the rotor 20 is acceptable within a range indicated by broken lines and one dot chain lines in FIG. 3; a maximum value of the acceptable camming $\delta(\delta/2+\delta/2)$ of this rotor 20 is a "standard value of camming", and this is a known value defined for every vehicle type. A stroke of the shaft 30 by amount corresponding to this standard value $\delta$, that is, a stroke of the shaft 30 until the shaft 30 comes into contact with the rotor 20 via the friction member 24in might vary.

From the above, in this embodiment, every time when the electric brake 8 is operated, the contact stroke sa, which is a stroke of the shaft 30 until the shaft 30 comes into contact with the rotor 20 via the friction member 24in, is acquired, and a value obtained by subtracting a greater value $(\delta+\beta)$ than the standard value $\delta$ of the camming from the contact stroke sa is acquired as a speed-reduction starting stroke sth. $\beta$ is a value of not less than 0, and for example, $\beta$ may be a value of not less than 0 to not more than the standard value $\delta$ of the camming of the rotor 20: $sth = sa - (\delta+\beta)$. In addition, it is configured to reduce the forward speed of the shaft 30 from the moment when the stroke of the shaft 30 reaches the speed-reduction starting stroke sth.

Furthermore, in this embodiment, when the brake-operation instruction is outputted, a rotation speed control on the electric motor 6, that is, a control to bring the rotation speed of the electric motor 6 to approximate a target rotation speed is carried out. At the start-up time of the electric motor 6, the target rotation speed is set to be a first rotation speed corresponding to a first speed of the shaft 30. The first rotation speed may be set to be a maximum rotation speed that can be outputted by the electric motor 6, or set to be a speed depending on the operation speed of the brake operation member 52 operated by the driver, or the like, for example. When the stroke s of the shaft 30 reaches the speed-reduction starting stroke sth, the target rotation speed is set to be a second rotation speed corresponding to a second speed of the shaft 30. The second rotation speed is a small value than the first rotation speed, so that the forward sheep of the shaft 30 is reduced. When the pair of brake friction members 24in, 24out are pushed against the rotor 20, an axial force control on the electric motor 6, that is, a control to bring the axial force applied to the shaft 30 (equal to a pushing force that pushes the pair of brake friction members 24in, 24out against the rotor 20) to approximate a target axial force Fdref provided from the brake ECU 4.

Figure 4:
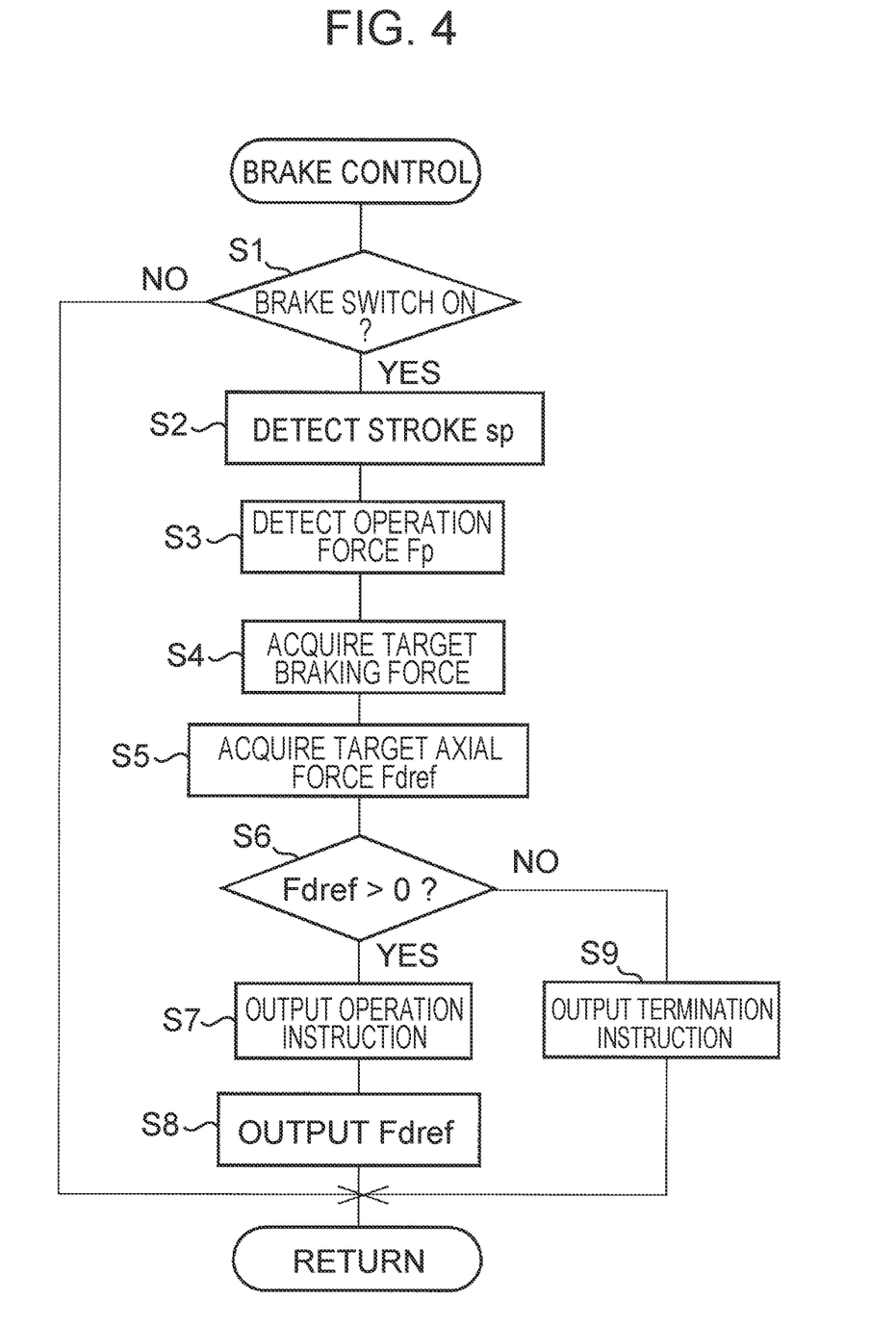
FIG. 4 is a flowchart indicating a brake control program stored on a memory unit of a brake ECU included in the brake system.

A brake control program indicated in a flowchart of FIG. 4 is executed in the brake ECU 4. In step 1 (hereinafter, referred to briefly as S1. This is the same in the other steps), whether or not the brake operation member 52 is operated is detected based on an ON-OFF state of the brake switch 53.

If the brake switch 53 is in the ON state, in S2 and S3, an operation stroke sp and an operation force Fp of the brake operation member 52 are respectively detected by the stroke sensor 54 and the operation force sensor 56. In S4 and S5, a target braking force Fref is acquired based on at least one of the operation stroke sp and the operation force Fp, and a target axial force Fdref is determined based on the target braking force Fref. The target axial force Fdref might be set to be a value approximately the same as the target driving force (Fdref≈Fref) in some cases; and if a regenerative cooperation control is carried out, or the like, the target axial force Fdref is set to be a value approximately the same as a value obtained by subtracting a regenerative braking force Fe from the target braking force (Fdref≈Fref−Fe). In S6, it is determined whether or not the target axial force Fdref is greater than 0; and if this is greater than 0, the brake-operation instruction and the target axial force Fdref are outputted respectively in S7 and S8. To the contrary, if the target axial force Fdref is not more than 0, a termination instruction is outputted in S9.

Figure 5A:
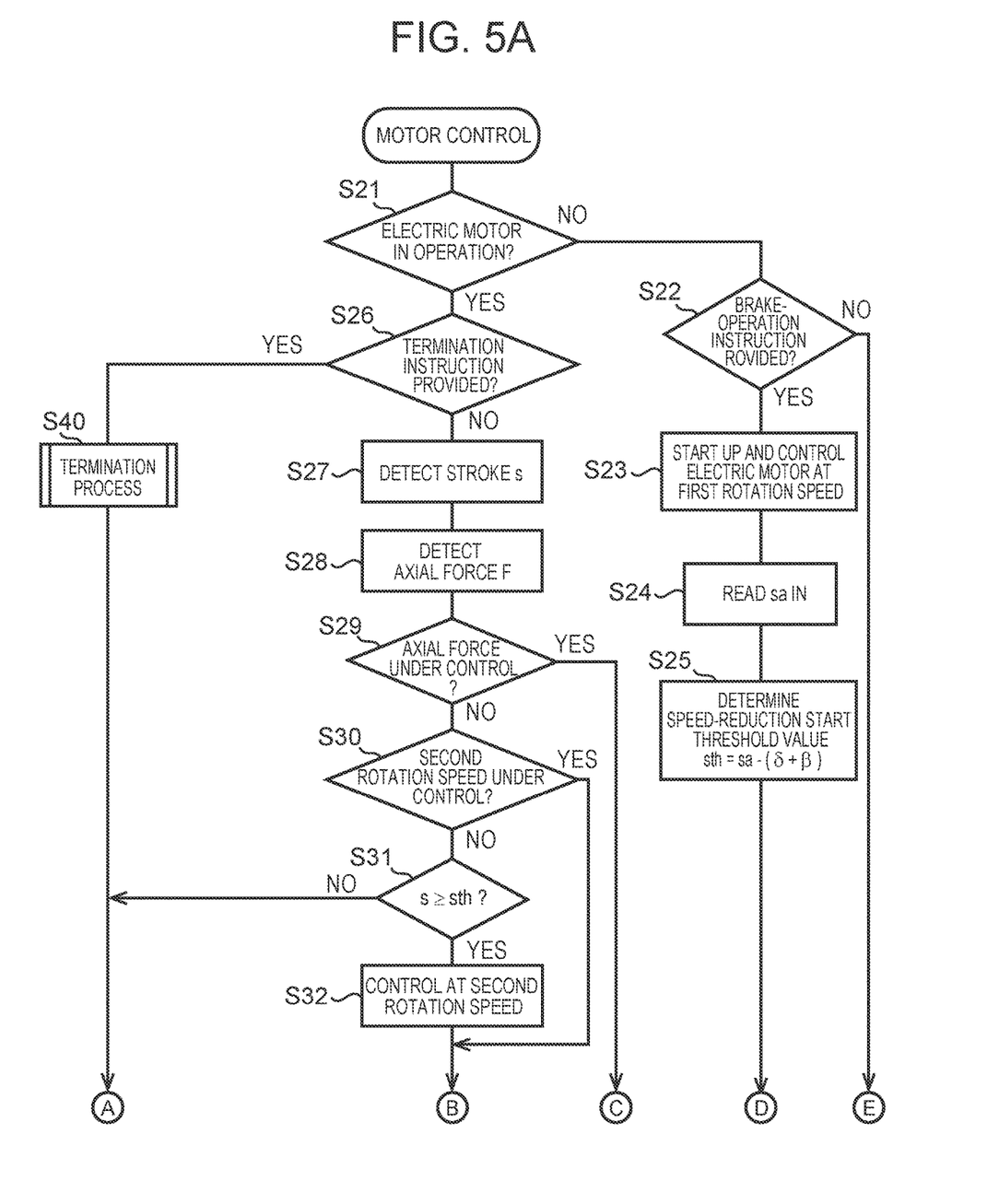
FIG. 5A is a flowchart indicating a motor control program stored on the memory unit of the motor ECU.
Figure 5B:
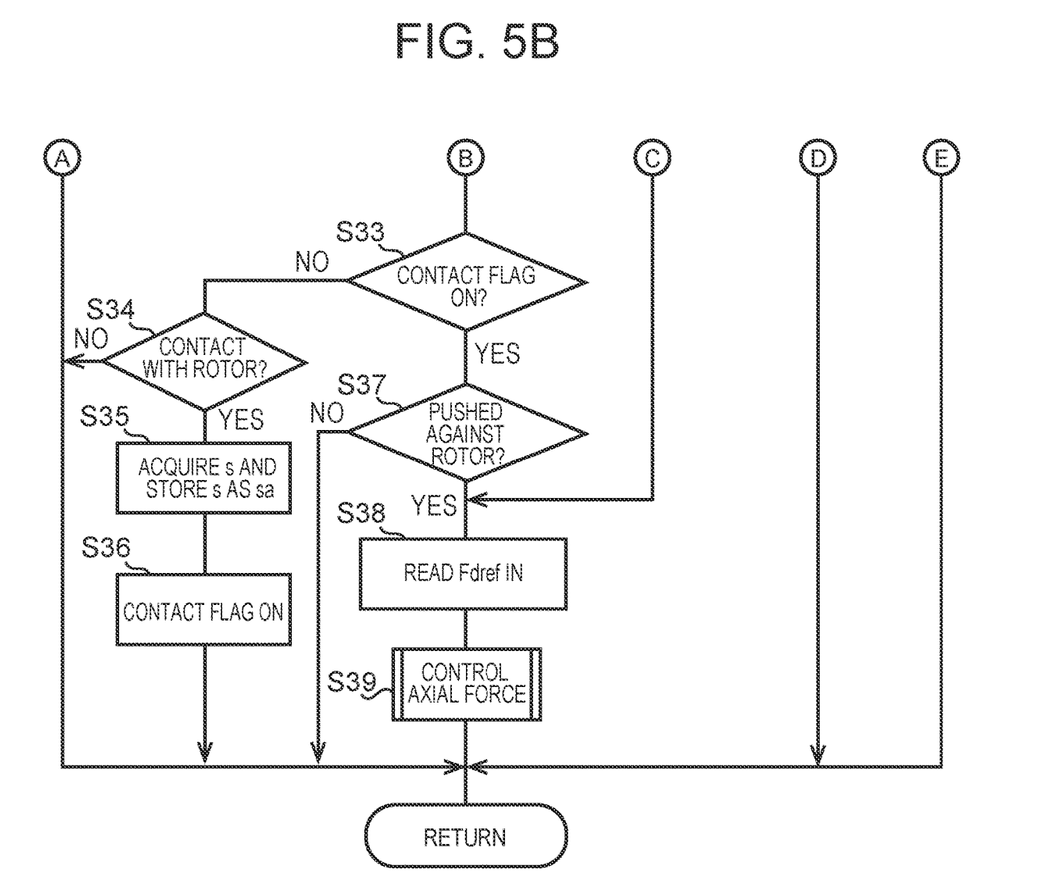
FIG. 5B is a flowchart indicating a motor control program stored on the memory unit of the motor ECU.

In the motor ECU 10, a motor control program indicated in a flowchart of FIGS. 5A and 5B are executed at every predefined set time. In S21, it is determined whether or not the electric motor 6 is in operation; in S22, it is determined whether or not the brake-operation instruction is provided from the brake ECU 4. When the electric motor 6 is in a stop state and when the brake-operation instruction is not provided, S21 and S22 are repetitively executed, and the electric motor 6 is maintained to be in the stop state. On the other hand, when the brake-operation instruction is outputted, the determination in S22 is YES; and in S23, the electric motor 6 is started up, and the electric motor 6 is rotated at the first rotation speed. Through this, the shaft 30 is moved forward at the first speed. In S24, as will be described later, the contact stroke sa that has been acquired when the electric brake 8 was previously operated, and is stored on the memory unit 40m is read in; and in S25, the speed-reduction starting stroke sth is determined in the above-described manner. Description regarding storage of the contact stroke sa and others will be provided later.

Next, when this program is executed, the electric motor 6 is in operation, and thus the determination in S21 is YES; and in S26, it is determined whether or not the termination instruction is provided. If no termination instruction is provided, the stroke s and the axial force F of the shaft 30 are acquired respectively in S27 and S28; in S29, it is determined whether or not the electric motor 6 is under the axial-force control; and in S30, it is determined whether or not the rotation speed of the electric motor 6 is the second rotation speed. If S29 and S30 are firstly executed, both the determinations are No, and thus in S31, it is determined whether or not the stroke s of the shaft 30 reaches the speed-reduction starting stroke sth. If this determination is NO, S21 and S26 to 31 are repetitively executed.

When the stroke s of the shaft 30 reaches the speed-reduction starting stroke sth, the determination in S31 is YES; and in S32, the rotation of the electric motor 6 is reduced to the second rotation speed, so that the forward speed of the shaft 30 is reduced to the second speed. Thereafter, in S33, it is determined whether or not a contact flag is set to ON. The contact flag is a flag that is set to ON when the shaft 30 comes into contact with the rotor 20 via the friction member 24in. If the determination is NO, in S34, it is determined whether or not the shaft 30 comes into contact with the rotor 20 via the friction member 24in. When the shaft 30 comes into contact with the rotor 20 via the friction member 24in, the axial force F becomes drastically great. Hence, for example, if it is satisfied that the degree of the axial force F becomes the set value or more, and also when increase gradient of the axial force F is a set gradient or more, it can be determined that the shaft 30 comes into contact with the rotor 20 via the friction member 24in. Before the shaft 30 comes into contact with the rotor 20 via the friction member 24in, S21, S26 to S30, S33, and S34 are repetitively executed, and during this time period, the shaft 30 is moved forward at the second speed. In a short time later, when the shaft 30 comes into contact with the rotor 20 via the friction member 24in, the determination in S34 is YES; and in S35, the stroke s at the current moment is acquired, and this stroke is stored as the contact stroke sa (see FIG. 2B) on the memory unit 40m; and then the contact flag is set to ON in S36. Currently, the contact stroke sa stored in S35 will be used when the electric brake 8 is operated next time.

When this program is executed next time, S21, S26 to S30, and S33 are executed, and since the contact flag is ON, the determination in S33 is YES, and in S37, it is determined whether or not the pair of brake friction members 24in, 24out are pushed against the rotor 20. When the pair of brake friction members 24in, 24out are pushed against the rotor 20, the axial force applied to the shaft 30 becomes drastically great. Hence, as with the execution in S34, based on the degree of the axial force F, the change in gradient, and others, it is determined whether or not the pair of brake friction members 24in, 24out are pushed against the rotor 20. Meanwhile, the axial force when the pair of brake friction members 24in, 24out are pushed against the rotor 20 becomes normally greater than the axial force when the shaft 30 comes into contact with the rotor 20 via the friction member 24in. Hence, the above determination may be carried out under such a condition that the degree of the axial force F is greater than that of the axial force F when the shaft 30 comes into contact with the friction member 24in.

Before the pair of brake friction members 24in, 24out are pushed against the rotor 20, S21, S26 to S30, S33, and S37 are repetitively executed so that the forward speed of the shaft 30 is maintained at the second speed. Then, when the pair of the brake friction members 24in, 24out are pushed against the rotor 20, the determination in S37 is YES; and in S38 and S39, the target axial force Fdref provided from the brake ECU 4 is read in so as to carry out the axial force control. For example, a feed-back control may be carried out so as to bring the axial force F detected by the axial force sensor 36 to approximate the target axial force Fdref. When the axial force control is started, the determination in S29 is YES, and thus S21, S26 to 29, S38, and S39 are repetitively executed to continuously carry out the axial force control. Then, when the termination instruction is provided from the brake ECU 4, the determination in S26 is YES; and in S40, a termination process, such as stopping of the electric motor 6 or the like, is carried out.

Figure 6:
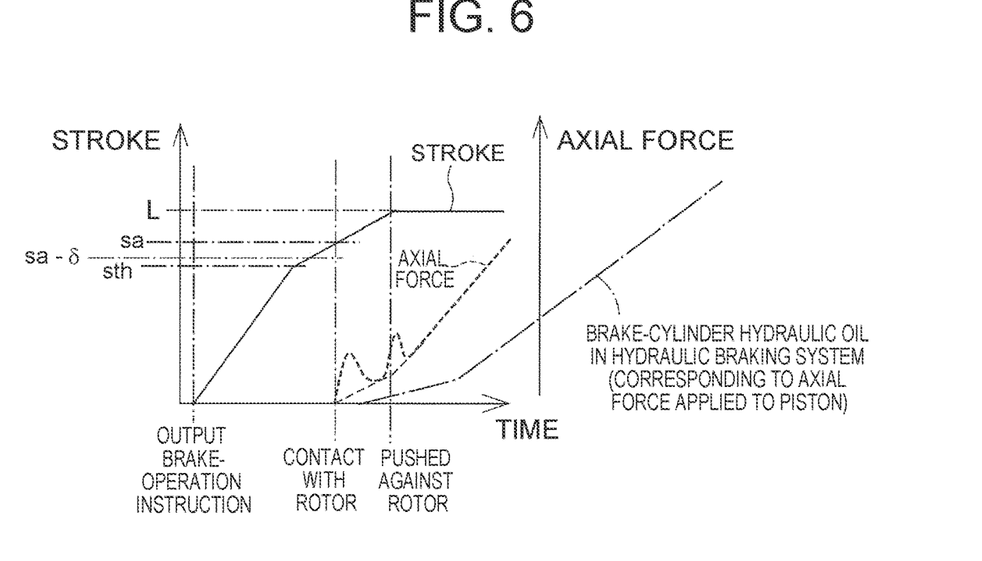
FIG. 6 is a view showing changes of a stroke and an axial force of the electric brake.

Changes of the stroke s and the axial force F of the shaft 30 when the electric motor 6 is controlled in the above manner are shown in FIG. 6. As indicated by a solid line of FIG. 6, at the start-up time of the electric motor 6, the shaft 30 is moved forward at the first speed, and when the stroke s of the shaft 30 reaches the speed-reduction starting stroke sth, the speed of the shaft 30 is reduced so that the shaft 30 is moved forward at the second speed. In this manner, the forward speed of the shaft 30 is reduced so as to be smaller than the first speed before the shaft 30 comes into contact with the rotor 20 via the friction member 24in; thus, when the shaft 30 comes into contact with the rotor 20 via the friction member 24in as indicated by a broken line, it is possible to suppress vibrations of the axial force caused at the moment when the pair of brake friction members 24in, 24out are pushed against the rotor 20, compared with the case in which the forward speed is maintained at the first speed. Accordingly, it is possible to reduce generated sounds, to thereby reduce noises applied to the motor ECU 10.

In addition, the speed-reduction starting stroke sth is set to be a value obtained by subtracting a greater value ($\delta+\beta$) than the standard value $\delta$ from the contact stroke sa; therefore, even in the case in which the contact stroke sa becomes smaller due to the camming of the rotor 20, it is possible to securely reduce the speed of the shaft 30 before the shaft 30 comes into contact with the rotor 20 via the friction member 24in, to thereby suppress the vibrations. Meanwhile, the speed-reduction starting stroke sth may be set to be a value (sa-$\delta$) obtained by subtracting the standard value $\delta$ from the contact stroke sa during the previous operation of the electric brake 8, or may be set to be a value (sa-$\alpha$) obtained by subtracting a set value $\alpha$ ($<\beta$) from the contact stroke sa during the previous operation of the electric brake 8. Also in this case, since it is possible to reduced the forward speed of the shaft 30 to the second speed before the pair of brake friction members 24in, 24out are pushed against the rotor 20, vibrations can be suppressed from being generated at the time of pushing the pair of brake friction members 24in, 24out against the rotor 20, thus to preferably reduce initial response time of the brake, and prevent generation of greater vibrations.

In the case of the electric brake 8, when the brake-operation instruction is outputted, it is possible to immediately start up the electric motor 6 to move the shaft 30 forward. On the other hand, in a hydraulic braking system, as indicated by a one dot chain line in FIG. 6, when the brake-operation instruction is outputted, a hydraulic operating device on an upstream side is started up so as to supply a hydraulic oil to a brake cylinder provided to a wheel from the upstream, to thereby move a brake piston forward. Hence, even when the forward speed of the shaft 30 is reduced in the electric brake 8, the initial response time of the brake becomes smaller, compared with that in the case of the hydraulic brake system. In addition, if the first rotation speed is set to be a maximum value that can be outputted by the electric motor 6, it is possible to further reduce the initial response time of the electric brake 8.

As aforementioned, in this embodiment, a motor controller is composed of a section that stores the motor control program indicated in the flowchart of the motor ECU 10 in FIGS. 5A and 5B, a section that executes this program, and others. Of this motor controller, a forward speed control unit is composed of a section that stores S23, S27, S30 to S32, a section that executes these steps, and others; an axial-force control unit is composed of a section that stores S39, a section that executes this step, and others; and a set-position determining unit is composed of a section that stores S25, a section that executes this step, and others. The contact position is a position of the front end surface 30A when the shaft 30 comes into contact with the rotor 20 via the friction member 24in, and in this case, the stroke of the shaft 30 (front end surface 30A) corresponds to the contact stroke sa. The set position corresponds to a position of the front end surface 30A when the stroke of the shaft 30 reaches the speed-reduction starting stroke sth.

The structure of the electric brake 8 is not limited to a particular one. It is not essential to configure the set position to be a position at or more rearward than the standard value $\delta$ of the contact stroke sa, and may be any position as far as this position is located more rearward than the position of the shaft 30 when the brake friction members 24in, 24out are pushed against the rotor 20. In addition, this disclosure may be applied to a drum brake including a drum as a brake rotary body. In this case, this disclosure may be implemented in a manner being subjected to various improvements and modifications based on the knowledge of those skilled in the art such that the set position may be determined based on the standard value for deviation of a fixing position of the drum, or the like.

What is claimed is:

1. An electric brake device comprising:
an electric brake being configured such that a shaft is moved forward by driving of an electric motor, and a forward movement of the shaft brings the electric brake into an acting state in which brake friction members are pushed against a brake rotary body so as to suppress rotation of a wheel; and
a motor controller being configured to control the electric motor,
wherein
through a rotation speed control of the electric motor, after the shaft reaches a set position before the electric brake comes into the acting state, the motor controller controls a forward speed of the shaft to be smaller than that before the shaft reaches the set position, wherein
the brake rotary body is a disc rotor integrally and rotatably fixed to the wheel,
the electric brake is a disc brake that includes a pair of the brake friction members located on both sides of the disc rotor, and comes into the acting state in which the brake friction members are pushed against the disc rotor,
the motor controller stores a contact position that is a position where the shaft comes into contact with the disc rotor via one of the brake friction members, and
the motor controller defines, as the set position, a position located more rearward than the contact position stored during a previous operation of the electric brake with not less than a distance determined based on a standard value of camming of the disc rotor.

2. The electric brake device according to claim 1, wherein through the control on the electric motor, the motor controller controls the forward speed of the shaft to be a first speed before the shaft reaches the set position, and
the motor controller controls the forward speed to be a second speed smaller than the first speed after the shaft reaches the set position.

3. The electric brake device according to claim 1, wherein before the shaft reaches the set position, the motor controller controls the rotation speed of the electric motor to be a maximum rotation speed outputted by the electric motor.

4. The electric brake device according to claim 2, wherein the motor controller controls the rotation speed of the electric motor such that the forward speed of the shaft becomes the second speed after the shaft reaches the set position until the electric motor comes into an acting state.

5. The electric brake device according to claim 1, wherein the motor controller controls the electric motor such that when the electric brake comes into the acting state, an axial force applied to the shaft is brought to approximate a target axial force determined based on an operation condition of a brake operation member operated by a driver.

6. The electric brake device according to claim 1, wherein the set position is defined as a position determined based on a value of variation of a gap between the brake friction member and a front end surface of the shaft when the shaft is at a rearmost position.

7. The electric brake device according to claim 1, wherein the electric brake device includes: a speed reducer that reduces rotation of the electric motor; and a movement converting mechanism that converts rotation of an output shaft of the speed reducer into a linear movement, and outputs the linear movement to the shaft.

8. The electric brake device according to claim 1, wherein the electric brake device includes: a stroke sensor detecting a stroke of the shaft; and an axial force sensor detecting an axial force applied to the shaft.

9. An electric brake device comprising:
an electric brake being configured to be operated by driving of an electric motor, and push brake friction members against a brake rotary body by using a shaft so as to suppress rotation of a wheel; and
a motor controller being configured to control the electric motor,
wherein
through a rotation speed control on the electric motor, the motor controller controls a forward speed of the shaft to be not more than a predefined set speed, after the shaft reaches a set position before the shaft comes into contact with the brake rotary body via the brake friction members,
the brake rotary body is a disc rotor integrally and rotatably fixed to the wheel,
the electric brake is a disc brake that includes a pair of the brake friction members located on both sides of the disc rotor, and comes into an acting state in which the brake friction members are pushed against the disc rotor,
the motor controller stores a contact position that is a position where the shaft comes into contact with the disc rotor via one of the brake friction members, and
the motor controller defines, as the set position, a position located more rearward than the contact position stored during a previous operation of the electric brake with not less than a distance determined based on a standard value of camming of the disc rotor.

10. An electric brake device comprising:
an electric brake being configured to be operated by driving of an electric motor, and push brake friction members against a brake rotary body by using a shaft so as to suppress rotation of a wheel; and
a motor controller being configured to control the electric motor,
wherein
through a rotation speed control on the electric motor,
the motor controller controls a forward speed of the shaft to be smaller than a forward speed thereof before the shaft reaches a set position, after the shaft reaches the set position before the shaft comes into contact with the brake rotary body via the brake friction members,
the brake rotary body is a disc rotor integrally and rotatably fixed to the wheel,
the electric brake is a disc brake that includes a pair of the brake friction members located on both sides of the disc rotor, and comes into an acting state in which the brake friction members are pushed against the disc rotor,
the motor controller stores a contact position that is a position where the shaft comes into contact with the disc rotor via one of the brake friction members, and
the motor controller defines, as the set position, a position located more rearward than the contact position stored during a previous operation of the electric brake with not less than a distance determined based on a standard value of camming of the disc rotor.

* * * * *